Oct. 6, 1925.
F. M. BLAKE
1,555,900
SAFETY DEVICE FOR MOTOR VEHICLES
Filed Nov. 22, 1921
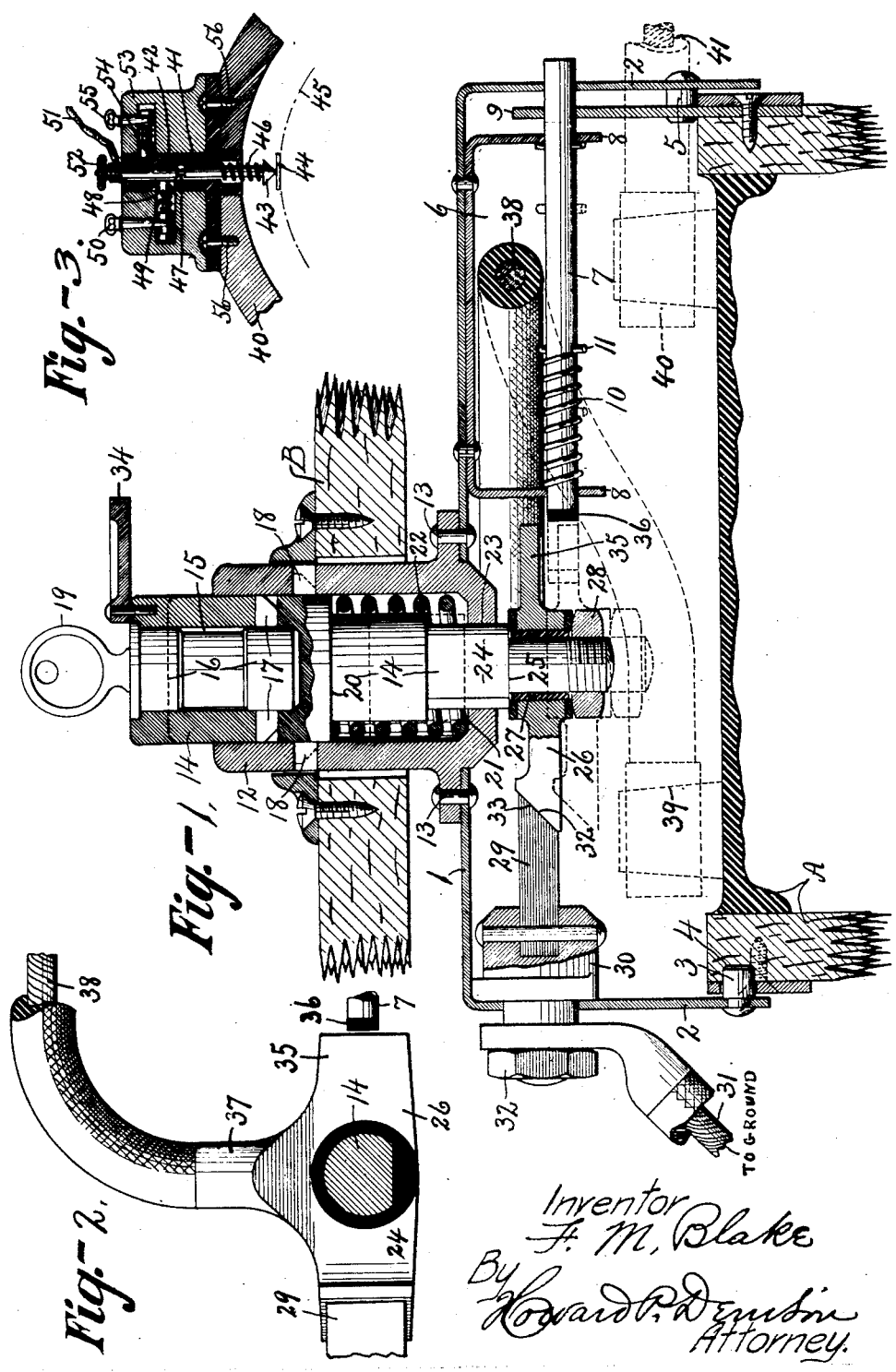

Patented Oct. 6, 1925.

1,555,900

UNITED STATES PATENT OFFICE.

FRED M. BLAKE, OF FULTON, NEW YORK.

SAFETY DEVICE FOR MOTOR VEHICLES.

Application filed November 22, 1921. Serial No. 517,096.

*To all whom it may concern:*

Be it known that I, FRED M. BLAKE, of Fulton, in the county of Oswego, in the State of New York, have invented new and useful Improvements in Safety Devices for Motor Vehicles, of which the following, taken in connection with the accompanying drawings, is a full, clear, and exact description.

This invention relates to a safety device for use in connection of storage batteries and the several electric circuits commonly employed in motor vehicles for starting, lighting, ignition and other purposes to reduce the liability of fires from short circuits, theft of the machine, and current leakage, and at the same time to protect the battery terminals and their connections with the out-going of the turn cables from malicious interference as set forth in my pending application Sr. #462,018 filed April 16, 1921.

In machines of this character, the current supply cable leading from one of the battery terminals is usually branched to the several translating devices, such as the starting motor, spark plugs, electric lamps, horn and other devices, which may be used on the machine, all of which translating devices are preferably grounded upon the frame of the machine for economy in wiring, while the other battery terminal is preferably connected by a separate cable to the same ground or frame of the machine to complete the several circuits, and one of the main objects of my present invention is to interpose a self-closing electric switch in the ground connection of the battery and to provide simple and efficient means having a movable switch-operating member projecting through the floor board of the machine in the path of travel of the operator in entering and leaving the car, whereby pressure upon said member by the operator in leaving the car will open the switch and automatically lock the same in its open position to be released only by the application of a suitable key to the locking means, thereby permitting practically the entire electric system to be cut out from the battery by simply stepping on the switch-operating member in the natural movement of leaving the car, thus making it practically impossible to start the car to energize any of the translating devices until the switch is released by the application of the key to the locking device.

Another object is to mount the switch and its controlling means within and upon a suitable housing which constitutes a cover for the top of the battery to protect the terminal connections and switch against contact with external objects or malicious interference with any of the enclosed parts.

Another object is to provide the cover plate with a locking member into and out of engagement with a suitable keeper on the battery case for locking the cover plate in operative position and permitting it to be removed when the switch is closed.

A further object is to associate the movable switch member and locking member for the cover plate in such manner that the locking member will be held in its locking position by the movable switch member when opened.

Other objects and uses relating to specific parts of the device will be brought out in the following description.

In the drawings:

Fig. 1 is a transverse vertical sectional view of a safety device embodying the various features of the invention in operative relation to a storage battery and floor board of the car.

Fig. 2 is a detail horizontal sectional view taken on line a—a, Fig. 1.

Fig. 3 is a sectional view of a modified form of my device as used in connection with a magneto circuit.

As illustrated, this safety appliance comprises a sheet metal cover plate —1— of sufficient size to entirely cover the top of the storage battery —A— and is provided with a down-turn marginal flange —2— having at one side one or more lugs —3— adapted to enter a socket —4— in the adjacent side of the battery case just below the upper edge thereof, the opposite side of the cover plate being provided with one or more lugs —5— adapted to rest upon the upper edge of the corresponding side of the battery case and together with the lug or lugs —3— constitute means for supporting the cover plate removably upon the top of the battery with the upper horizontal portion of the cover plate a sufficient distance above the battery terminals to avoid contact therewith and to form an intervening chamber —6— for the reception and protection of the terminal connections and various parts of the safety appliance presently described.

A locking bolt —7— is slidable horizontally in suitable guide flanges —8— depending from the top of the cover plate —1— within the chamber —6— and is movable into and out of engagement with a relatively fixed keeper plate —9— on one side of the storage battery —A—, the outer end of said locking bolt being projected through an opening in the corresponding side of the cover plate where it is available for operation by hand or by a suitable implement against the action of a retracting spring —10— to release it from engagement of the keeper —9— when it is desired to release the cover, the keeper plate —9— being located at the same side of the battery as the lug —5— which engages the upper edge of a battery case so that when the locking bolt —7— is released, the adjacent side of the cover may be lifted upwardly and then above the battery case and then the entire plate moved forwardly to disengage the lugs —3— from the opposite side of the battery case, thereby detaching the cover plate from the battery to permit access to the interior of the cover and to the top of the battery when desired.

By reversing the operation just described, the cover may be restored to its closed position and locked in place by the lugs —3— and locking bolt —7— which latter is yieldingly held in its locked position by the spring —10— having one end bearing against a shoulder —11— on the bolt as shown in Fig. 1.

A tubular post —12— is secured at its lower end in an opening in the top of the cover plate —1— by rivets —13— or equivalent fastening means to project upwardly through an opening in a floor board —B— which forms a removable part of the floor of the car preferably directly in front of the driver's seat and some distance above the battery —A— and its cover plate —1—.

A cylindrical plunger —14— is movable vertically in the tubular post —12— and is provided in its upper end with a cylindrical chamber or socket —15— open at the top for receiving a cylinder lock —16— having locking bolts —17—, which are movable in radial openings in the plunger —16— and are spring pressed outwardly for automatically engaging in openings —18— in corresponding sides of the post —12— when registered therewith but are adapted to be withdrawn from said openings —18— by a key —19— inserted in the upper end of the lock —16—.

The lower end of the plunger —14— is reduced in diameter to form a shoulder —20—, while the chamber in the lower end of the post —12— is also reduced in diameter to from a shoulder —21— for the lower end of a coil spring —22— which surrounds the lower reduced portion of the plunger —14— and has its upper end engaged with a shoulder —20— for normally elevating the plunger and thereby normally holding the locking member —17— out of registration with or above the keeper openings —18— by bearing against the inner surface of the post —12—.

The lower reduced end of the plunger —14— extends through an opening —23— in the bottom of the post —12— and is provided with a flattened side —24— engaging a corresponding flattened side of the opening —23— to prevent turning of the plunger and thereby to keep the locking member —17— in vertical alinement with the keeper opening —18—.

The extreme lower end of the plunger —14— below the bottom of the post —12— is further reduced to form a shoulder —25— and is adapted to receive an electric switch member —26— which is insulated from the adjacent portion of the plunger by insulation —27— and is held in fixed relation to said post by a clamping nut —28— engaging the lower threaded end of the plunger.

A relatively fixed laminated switch member —29— is secured at one end to a binding post —30— which extends through an opening in the adjacent side of the cover plate —1— for receiving a return conductor —31—, the latter being clamped to the binding post by means of a nut —32— to form an electric connection therewith and is preferably grounded on the frame of the machine.

The switch member —26— is movable into and out of contact with the relatively fixed switch member —29— and their contacting faces are beveled at —32— and —33—, respectively, to cause the beveled face of the switch member —26— to engage the beveled face of the switch member —27— with an upper wiping contact which owing to the resiliency of the free ends of the lamina of the switch member —29— assure a more perfect electrical connection between the two members and tends to keep the contacting sufaces clean. That is, the switch member —26— is opened or separated from contact with the switch member —29— by downward pressure of the foot upon the upper end of the plunger —14— against the action of the spring —22— until locked in its open position by the engagement of the locking bolts —17— in the openings —18— in the post —12—, it being understood that during this downward pressure upon the upper end of the foot, the key —19— will be removed and the upper end of the lock closed by a swinging cap —34— so that the foot pressure is actually upon the upper surface of the cap which is a part of and moves with the plunger —14—.

The switch member —26— is provided with a radially extendinng heel piece —35— which is normally above the plane of movement of the cover locking bolt —7— when the switch is closed but is movable into registration with the inner end of said locking bolt as shown by dotted lines in Fig. 1 when the switch member —26— and its operating plunger —14— are locked in their down or open positions, thereby locking the bolt —7— against inward movement and preventing the removal of the cover plate —1— from the battery and also preventing access to the battery terminals and other parts enclosed by the cover plate to further protect the machine against theft or malicious interference with the electrically controlled working parts of the machine, the inner end of the plunger —7— being provided with an insulating tip —36— to avoid any possibility of leakage of the current from the battery to the cover plate —1—.

The switch member —26— is also provided with a laterally projecting boss —37— to which is secured one end of a conductor —38— having its other end electrically connected to the return terminal as —39— of the battery. The conductor —38— and switch members —26— and —29— form parts of the ground connection between the battery terminal —39— and grounded conductor —21— when the switch member —26— is closed, the other battery terminal as —40— being connected by current supply cable —41— to suitable controllers, not shown, for the several translating devices not necessary to herein illustrate or describe.

The operation briefly described is as follows:

Assuming that the key —19— is withdrawn and that the cap —34— and switch member —26— are in their closed position with the plunger —14— in its uppermost position as determined by the contact of the switch member —26— with the switch member —29— and that the occupant of the car is about to leave the same. Then in passing out of the car, the operator simply steps on the upper end of the plunger —14— with sufficient pressure to depress the plunger and thereby to open the switch member —26— and allow the locking members —17— to spring into the openings —18—, thus locking the switch member —26— and its operating plunger —14— in its down position against the action of the spring —22— and also registering the heel —35— of the switch member —26— with the inner end of the locking bolt —17— for the cover plate —1—.

By this operation, the grounded side of the battery circuit is broken or open and at the same time, the bolt —7— is held in its locking position to hold the cover plate —1— on the top of the battery, thereby positively cutting out all of the circuits leading to the several translating devices and at the same time locking the cover plate in its operating position to further reduce the possibility of theft or malicious interference with the battery connections and in addition to reduce liability of fires or leakages by short circuits.

When the driver of the car returns, it is simply necessary to swing the cap —34— to one side and then to insert the key into the lock to withdraw the locking bolts —17— from the openings —18— whereupon the spring —22— will instantly force the plunger —14— and switch member —26— carried thereby upwardly to restore contact or electrical connection between the switch members —26— and —29— after which the key —19— may be withdrawn and the cap —34— restored to its closed position to re-establish electrical connection between the several circuits and ground although it is evident that the several translating devices may be connected by return conductors to the binding post —30— if desired without departing from the spirit of this invention.

In Fig. 3 is shown a safety appliance to be used in machines having magneto ignition and lighting circuits and comprising a magneto housing —40— upon which is mounted a tubular bushing —41— of insulating material forming a guide for a vertically movable plunger —42—, the latter having a contact member —43— on its lower end for electrical contact with one of the terminals as —44— of the magneto indicated by dotted lines at —45—. The plunger —42— is yieldingly held against the contact member —44— by a spring —46— and is provided with an angular groove —47— for receiving a radially moving locking bolt —48— when the plunger —42— is elevated to break the electrical connections between the parts —43— and —44—, said bolt being automatically forced to its locking position by a spring —49— but is opened by a key —50—.

The upper end of the plunger —42— constitutes a binding post for receiving one end of a cable —51— of the magneto circuit and constitutes a handle —52— by which the plunger may be drawn upwardly against the action of the retracting spring —46— when it is desired to break the magneto circuit and to lock the plunger in its open position to prevent theft of the car by the breaking of the magneto circuit and to prevent unauthorized persons from re-establishing said circuits without the use of the key —50—.

A cap —53— is fitted over and upon the tubular bushing —41— and contains the locking bolt —48— and an additional locking bolt —54—, which latter locks the caps to the bushing and is adapted to be unlocked by a key —55— when it is desired to remove the cap, said bushing being permanently secured to the housing —40— by clamping screws —56— which are also concealed by the cap —53—.

What I claim is:

1. In a fire and theft safety device for motor vehicles having a storage battery and electric translating devices to be energized thereby, a cover plate for said battery, a movable member for locking the cover plate to the battery, an electric switch within the cover plate and electrically connected in one side of the battery circuit, said switch having its movable member movable into and out of registration with said locking member as said switch member is opened and closed to hold said locking member against unlocking when the switch is opened, and means operable at will for opening the switch.

2. In a fire and theft safety device for motor vehicles having a storage battery and electric translating devices to be energized thereby, a cover plate for said battery forming therewith a chamber, means including a movable member for locking and unlocking the cover plate to and from the battery and projecting into said chamber, an electric switch in said chamber and connected in one side of the battery circuit, said switch including a movable member movable into and out of the path of movement of said locking member as the switch member is opened and closed to hold said locking member against unlocking when the switch member is open, and means operable at will for opening said switch member.

3. In a fire and theft safety device for motor vehicles having a storage battery and electric translating devices to be energized thereby, a cover plate therefor and forming therewith a relatively fixed switch member secured to the cover plate and projecting into the chamber, a movable switch member movable into and out of contact with the first named switch member, said switch members being electrically connected in one side of the battery circuit when the switch is closed, means for closing the movable switch member, and means operable at will for opening the movable switch member.

4. In a fire and theft safety device for motor vehicles having a storage battery and electric translating devices to be energized thereby, a cover for the top of the battery, means for locking and unlocking the cover plate to and from the battery, a laminated switch member secured to and projecting within the cover and provided with a beveled contact face, a movable self-closing switch member having a beveled face movable into and out of contact with the first named switch member, said switch members constituting an electric switch electrically connected in one side of the battery circuit, and means operable at will for opening the movable switch member.

5. In a fire and theft safety device for motor vehicles having a storage battery and electric translating devices to be energized thereby, a cover for the top of the battery, means for locking and unlocking the cover to and from the battery, a self-closing electric switch mounted within the cover and having its movable member movable into and out of the path of movement of the cover-locking means as said movable switch member is opened and closed to hold said cover-locking means against unlocking when the movable switch member is open, a plunger supporting said movable switch member and depressible by the foot of the operator to open the switch, and key controlled means for automatically locking said plunger in its depressed position.

6. In a safety device for reducing the theft and fire risks of motor vehicles having storage batteries and electric translating devices to be energized thereby, a removable cover cooperating with the battery case to inclose and conceal the battery terminals, an electric switch mounted upon and within the cover and having one of its contact members electrically connected to a "ground" outside of the cover and its other member electrically connected to one of the battery terminals wholly within said cover, pedal operated means supported by and extending to the exterior of the cover for opening the second named switch member, and automatic means for locking the second named switch member in its open position.

7. A fire and theft safety device for motor vehicles having a storage battery and electric translating devices to be energized therefrom, as in claim 6, in which the pedal operated means for the movable switch member normally extends through and above the floor board of the vehicle to be depressed and locked by the foot of the operator in passing out of the vehicle.

8. A fire and theft safety device for motor vehicles having a storage battery and electric translating devices energized thereby, as is in claim 6, in which a guide for the switch opening means is secured to the cover and extends through an opening in the floor board of the vehicle.

In witness whereof I have hereunto set my hand this 17th day of November, 1921.

FRED M. BLAKE.